(12) United States Patent
Krischker

(10) Patent No.: US 8,182,168 B2
(45) Date of Patent: May 22, 2012

(54) MACHINE ELEMENT FOR A SHAFT-HUB CONNECTION AND MANUFACTURING METHOD FOR A SHAFT-HUB CONNECTION

(75) Inventor: Utz Krischker, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 596 days.

(21) Appl. No.: 12/189,964

(22) Filed: Aug. 12, 2008

(65) Prior Publication Data

US 2009/0103971 A1    Apr. 23, 2009

(30) Foreign Application Priority Data

Aug. 17, 2007  (DE) .................. 10 2007 038 971

(51) Int. Cl.
*F16B 7/04*  (2006.01)
(52) U.S. Cl. .................... 403/351; 403/367; 403/372
(58) Field of Classification Search ............... 403/109.5, 403/350, 351, 366, 367, 372, 352
See application file for complete search history.

(56) References Cited

U.S. PATENT DOCUMENTS

| | | | | | |
|---|---|---|---|---|---|
| 436,357 | A | * | 9/1890 | King | 403/344 |
| 458,580 | A | * | 9/1891 | Irvin | 403/344 |
| 611,556 | A | * | 9/1898 | Blanton | 403/352 |
| 729,506 | A | * | 5/1903 | McMurtrie | 285/394 |
| 808,992 | A | * | 1/1906 | Lawson | 294/57 |
| 1,481,062 | A | * | 1/1924 | Johnson | 285/358 |
| 3,076,352 | A | * | 2/1963 | Larsh | 74/443 |
| 3,272,027 | A | * | 9/1966 | Wayman | 474/112 |
| 3,368,834 | A | * | 2/1968 | Stratienko | 403/352 |
| 3,419,227 | A | * | 12/1968 | McCarthy et al. | 242/571.7 |
| 3,515,418 | A | * | 6/1970 | Nielsen, Jr. | 403/109.5 |
| 4,373,405 | A | * | 2/1983 | Geil | 74/531 |
| 4,585,367 | A | * | 4/1986 | Gall | 403/104 |
| 5,048,998 | A | * | 9/1991 | Viets | 403/351 |
| 5,069,654 | A | * | 12/1991 | Rampe | 474/161 |
| 5,407,295 | A | * | 4/1995 | Kuhl | 403/350 |
| 5,417,511 | A | * | 5/1995 | Warden | 403/109.5 |
| 5,427,468 | A | * | 6/1995 | Muellenberg | 403/350 |
| 6,053,508 | A | * | 4/2000 | Kuhl | 279/102 |
| 6,292,992 | B1 | * | 9/2001 | Kuhl | 29/407.01 |
| 6,761,501 | B1 | * | 7/2004 | Nakatani | 403/109.5 |
| 7,633,722 | B1 | * | 12/2009 | Larson et al. | 360/265.2 |
| 2008/0152422 | A1 | | 6/2008 | Eisenblaetter | |

FOREIGN PATENT DOCUMENTS

DE    3900797 A1    11/1989
(Continued)

OTHER PUBLICATIONS

European Patent Office, European Search Report for Application No. 08009663.9 dated Jul. 24, 2009.

*Primary Examiner* — Joshua Kennedy
(74) *Attorney, Agent, or Firm* — Ingrassia Fisher & Lorenz, P.C.

(57) ABSTRACT

A machine element is provided that includes, but is not limited to a clamping element without a slit, which is incorporated into a receiving area of the machine element. The clamping element has an opening for accommodating a shaft, and can be twisted against the machine element. A support sleeve is arranged radially outside relative to the clamping element. This makes the machine element easy to manufacture, convenient to use, and allows the absorption of high levels of force.

11 Claims, 4 Drawing Sheets

FOREIGN PATENT DOCUMENTS

| | | |
|---|---|---|
| DE | 4327461 A1 | 10/1994 |
| DE | 19945097 A1 | 3/2001 |
| DE | 10213214 A1 | 10/2003 |
| DE | 10240441 B3 | 1/2004 |
| DE | 102005021833 A1 | 11/2006 |
| DE | 102007009492 A1 | 8/2008 |

* cited by examiner

MACHINE ELEMENT FOR A SHAFT-HUB CONNECTION AND MANUFACTURING METHOD FOR A SHAFT-HUB CONNECTION

CROSS-REFERENCE TO RELATED APPLICATION

This application claims priority to German Patent Application No. 102007038971.1, filed Aug. 17, 2007, which is incorporated herein by reference in its entirety.

TECHNICAL FIELD

The invention relates to a machine element for a shaft-hub connection for the torque-proof coupling of rotating or fixed machine elements with shafts by means of a lever actuated eccentric clamping sleeve, as well as a corresponding manufacturing method.

BACKGROUND

Various devices have in the past been suggested for establishing torque-proof connections between rotating or fixed machine elements, such as shafts that continuously rotate or alternatively rotate to and fro, and machine elements immovably secured thereto, such as levers, pulleys, cams, toothed wheels and the like. For example, DE 43 27 461 A1 discloses a device for the torque-proof connection of a shaft with a hexahedrally bordered machine part by means of a lever-actuated eccentric clamping sleeve. The latter includes a slit sleeve with an outer wedge profile, and the sleeve can be rotates against the outer machine element, thereby becoming jammed between the shaft and outer machine element.

The lengthwise slit introduced in the sleeve enables an elastic deformation of the sleeve in a radial direction. However, the truth of running is limited. Further, clamping can give rise to stresses that are so high that the machine element with the hub can be damaged, in particular at small shaft diameters.

In view of the foregoing, at least one object is to create a machine element that enables an easy to manufacture and convenient to use shaft-hub connection, and can absorb high levels of force, as well as to provide a method for manufacturing such a shaft-hub connection. In addition, other objects, desirable features, and characteristics will become apparent from the subsequent summary and detailed description, and the appended claims, taken in conjunction with the accompanying drawings and this background.

SUMMARY

The at least one object, other objects, desirable features, and characteristics, is achieved by means of a machine element for a shaft-hub connection that includes, but is not limited to a receiving area and a clamping element without a slit incorporated in the receiving area that has an opening for accommodating a shaft and can be twisted against the machine element. The machine element also includes, but is not limited to a support sleeve arranged radially outside relative to the clamping element.

The at least one object, other objects, desirable features, and characteristics are also achieved by a manufacturing method. The method including, but not limited to the steps of preparing a machine element for a shaft-hub connection that includes, but is not limited to a receiving area and a clamping element without a slit incorporated in the receiving area that has an opening for accommodating a shaft and can be twisted against the machine element. The machine element also includes, but is not limited to a support sleeve arranged radially outside relative to the clamping element. The method further includes, but is not limited to machining the clamping element, in particular by drilling, turning and/or grinding, to generate the opening, insertion of a shaft into the opening and twisting the shaft and/or clamping element relative to the machine element to establish a torque-proof connection between the shaft and machine element.

The machine element for a shaft-hub is used for the torque-proof coupling of rotating machine elements with shafts, and the rotating machine elements include toothed wheels, pulleys, axial locking rings, parts of bearing arrangements, parts of sealing arrangements, levers and the like. The rotating motion of the respective machine element can be a continuous rotating motion with constant or alternating speed, with constant rotating direction or also a back-and-forth rotating motion with alternating rotating direction. The shaft can be a solid shaft, a hollow shaft or the like. Its exterior has a bearing surface that is preferably cylindrical.

The machine element has a receiving area, which incorporates a clamping element without a slit. In other words, the clamping element has no radially continuous slit in the lengthwise direction, and hence is continuously closed in the peripheral direction. It can preferably be elastically compressed in the radial direction, made possible through the selection of an appropriately low wall thickness of the clamping element, for example. The elasticity of the clamping element can be increased even further by providing it with longitudinal grooves or inclined grooves inside and/or outside. However, the latter do not penetrate through the clamping element, i.e., no slits are formed. The clamping element exhibits an opening, in particular a central borehole for accommodating the shaft, and the diameter of the opening is such that the clamping element can be slipped onto the shaft with little clearance. The elasticity of the clamping element is great enough to overcome the existing clearance during the elastic deformation of the clamping element, so as to secure the clamping element on the shaft friction-tight. The clamping element is elastically deformed through the relative twisting of the clamping element against the machine element. According to an embodiment, the machine element has a support sleeve that is arranged radially outside relative to the clamping element, and can absorb compressive forces. In particular, the clamping element is arranged inside the support sleeve, preferably in a concentric manner. It is especially preferred that the support sleeve exhibit a length in an axial direction measuring at least the axial length of the clamping element.

The support sleeve can at least partially absorb the forces exerted on the machine element by the clamping element, so that stresses within the material of the machine element can be reduced. As a result, the machine element can also be used for shafts with relatively small diameters, making it possible to use tools with a smaller jaw spans during the assembly of the shaft-hub connection. In addition, a less expensive material can be used for the machine element, so that a machine element can be made out of plastic, in particular a duromer, without having to worry about component failure. In particular, the machine element exhibits a duroplastic material, which improves the service life and wears resistance.

The machine element is preferably fabricated via casting, in particular (plastic) injection molding. As a result, the support sleeve and/or clamping element can be sheathed by the machine element. This simplifies production, and yields a good connection with the material of the machine element.

In particular, the support sleeve has feed-through openings that in particular run in essentially a radial manner. This reduces the weight without significantly detracting from stability. In addition, the bond between the support sleeve and machine element can be improved. In particular if the support sleeve is sheathed by the machine element, the material of the machine element can penetrate into the feed-through openings and provide an additional positive fit, so that in particularly distinctly higher shearing forces can be conveyed.

In order to further improve the bond between the support sleeve and machine element, the contouring of the support sleeve can be coarsened. For this purpose, the support sleeve can have an average roughness $R_a$ of about 0.1-50 μm, in particular about 1.0-50 μm, preferably about 3.0-50 μm, and especially preferred about 10.0-50 μm. Additionally or alternatively, the support sleeve can have notches, and the notches can in particular be fabricated without cutting via cold forming, rolling, embossing, sand blasting or shot preening. In particular when sheathing with the material of the machine element, the irregular surface of the support sleeve makes it possible to achieve an additional positive fit, which enables the transfer of higher forces.

The thickness of the support sleeve can be adjusted depending on the application. For example, the thickness of an essentially annular cylindrical support sleeve can be increased so as to enable the absorption of higher compressive forces and stresses. It is particularly preferred that the support sleeve be thick enough to provide at least one threaded borehole running in an axial direction in the support sleeve. As a result, the machine element can be connected with another component via the support sleeve, without having to provide a direct connection with the material of the machine element. This makes it possible to use a material for the machine element that might not be particularly well suited for a connection with other components, for example, owing to its brittleness. The increased flexibility in material selection permits the use of less expensive materials.

The clamping element can basically be incorporated into the machine element in different ways. In a first embodiment, for example, it is pressed into the machine element, so as to be held there in a press fit. The corresponding cam profile can be rough-finished in the machine element. It is also possible to design the clamping element in such a way as to itself fabricate the cam profile in a cutting process. It is radially precompressed by the press fit. The desired truth of running for the machine element is now established by preferably machining the borehole of the clamping element. For example, it is turned out, drilled out, ground out, etc. In addition, one or both faces of the clamping element or machine element can be end faced if they project over the machine element. Turning, milling, grinding or similar machining processes are again possible.

The clamping element is most preferably incorporated into the machine element already during the manufacture of the latter. For example, the machine element consists of a material that can be injection or transfer molded, such as diecast zinc, aluminum, a thermoplastic, duroplastic, duromer or another plastic, either reinforced with fiber or not. During the manufacture of the machine element, the clamping element can be introduced in the corresponding mold, and sheathed by the material of the machine element. In this state, the clamping element preferably still exhibits a wall thickness that is greater than desired and required for later use. In this molding process, the material of the machine element sheaths the clamping element, thereby adjusting to its external shape. The machine element thereby forms a receiving area for the clamping element that automatically exhibits an internal contour that fits the external contour of the clamping element. In particular, the external shape of the clamping element has at least one, but preferably two or three cam surfaces, which can be viewed as wedging surfaces, bent in the peripheral direction, and have the same direction of inclination.

After molding the machine element, the clamping element is preferably centrally machined. This can be done by turning, drilling, grinding or another type of machining process. For example, the machine element is accommodated by the clamping system of a machining device (e.g., the chuck of a lathe), after which the central borehole is turned to size. This automatically produces the desired dimensional correlation between a reference surface of the machine element and the central receiving borehole. Also achieved is the desired thinness of the clamping element walls, and hence its radial elasticity. For example, if the machine element is a pulley, the latter can be held on its outer periphery or some other reference surface, so as to achieve the desired centering of the borehole of the clamping element.

One or more mold clamping profiles are preferably provided on the clamping element and at a suitable location of the machine element, so as to hold tools for applying a relative clamping moment. For example, these profiles include an outer hub profile and inner clamping element profile (e.g., a bihexagonal Allen wrench or a claw coupling profile on the face).

The embodiment further relates to a shaft-hub connection with which rotating machine elements can be coupled in a torque-proof manner to shafts. The shaft-hub connection exhibits a shaft with a bearing surface and a machine element, and the machine element can be designed and further developed as described above. The bearing surface of the shaft is connected with the machine element via the clamping element. The shaft-hub connection is easy to fabricate, effective in use, and permits the absorption of high forces.

The embodiment further relates to a method for manufacturing a shaft-hub connection that involves first providing a machine element that can be designed and further developed as described above. The clamping element is then machined, in particular through drilling, turning and/or grinding, to create the opening. Subsequently, a shaft is inserted into the opening. Finally, the shaft and/or clamping element are twisted relative to the machine element to achieve a torque-proof connection between the shaft and machine element.

In particular, the machine element and clamping element are snapped onto the shaft to fabricate the shaft-hub connection between the machine element and shaft. This takes place after correspondingly establishing the interior dimensions of the clamping element and exterior dimensions of the shaft with a low clearance, and can hence be easily accomplished by hand. Corresponding handling systems or lever apparatuses, such as wrenches, are now positioned on the machine element and clamping element and a relative rotation is executed. As a rule, there is a weak material connection between the clamping element and the material of the machine element, which can be overcome with a slight torque if the outer surface of the clamping element is correspondingly smooth. The clamping element is broken off in the process. Once this has occurred, turning the clamping element generates a radial force that secures the machine element and clamping element to the shaft friction-tight.

It has been shown that the shaft-hub connections manufactured in this way are indeed durable and capable of bearing. They have a high truth of running at the lowest manufacturing costs. The type of connection can be used in a variety of ways.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
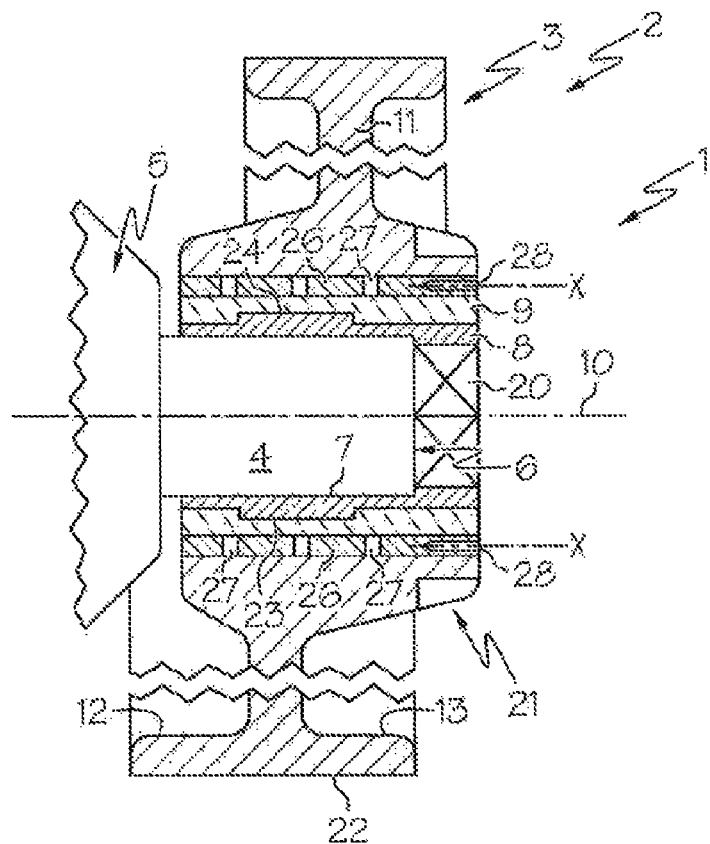
FIG. 1 shows a vertical sectional view of a shaft-hub connection with the machine element according to an embodiment.

FIG. 1 shows a shaft-hub connection 1 between a machine element 2 in the form of a pulley 3 and a shaft 4 or a shaft end. The shaft 4 is used to drive an aggregate 5 in a motor vehicle (not shown in any greater detail). However, the shaft-hub connection can be used elsewhere for connecting other machine elements and shafts.

The shaft end 4 is essentially cylindrical. It has a face 6 that is preferably essentially flat, and sits inside an opening in the form of a borehole 7 of a clamping element 8 incorporated in a hub 9 of the pulley 3. The clamping element 8, and hence the borehole 7, are concentrically oriented relative to a rotational axis 10 that coincides with the rotational axis of the shaft 4.

The pulley 3 has a support sleeve 26, which can be used to absorb forces and stresses arising in the pulley 3, so that the pulley 3 can tolerate distinctly higher forces emanating from the clamping element than without a support sleeve 26. The support sleeve 26 is arranged concentrically relative to the clamping element 8, and radially outside relative to the clamping element 8. In the exemplary embodiment shown, the support sleeve 26 and clamping element 8 have essentially the same axial length. The support sleeve 26 exhibits several feed-through openings 27, so that the bond between the support sleeve 26 and pulley 3 can be improved in particular if the support sleeve 26 is sheathed by the pulley 3. In this case, the material of the pulley 3 can flow into the feed-through openings 27 and penetrate through the support sleeve 26. In the exemplary embodiment shown, the support sleeve further exhibits schematically depicted threaded boreholes 28, so that further components (not shown) can be easily connected with the pulley 3 via the support sleeve 26.

The pulley 3 is not limited in shape. It can be set up for narrow belts as shown in the top half of FIG. 1, or for wide belts as shown in the bottom half of FIG. 1. The outer portion of the pulley 3 is connected with the hub 9 via a narrow, disk-shaped section 11. As shown, the outside of the hub 9 can be conical, or alternatively be cylindrical or some other shape (e.g., as a crown gear, toothed wheel, flat pulley, frictional wheel, cam or the like). In addition, the outer edge of the pulley 3 can have essentially cylindrical annular surfaces 12, 13, which are provided on either side of the disk-shaped sections 11.

The pulley 3 can be formed of a plastic, for example a duroplastic material, a thermoplastic material, or a metal that is not too solid, such as diecast zinc, aluminum, an aluminum alloy, magnesium, a magnesium alloy or the like. The pulley 3 is preferably manufactured in an injection or transfer molding process. The latter, in particular, is preferably used when using fiber-reinforced plastics with a high content of fiber.

Figure 2:
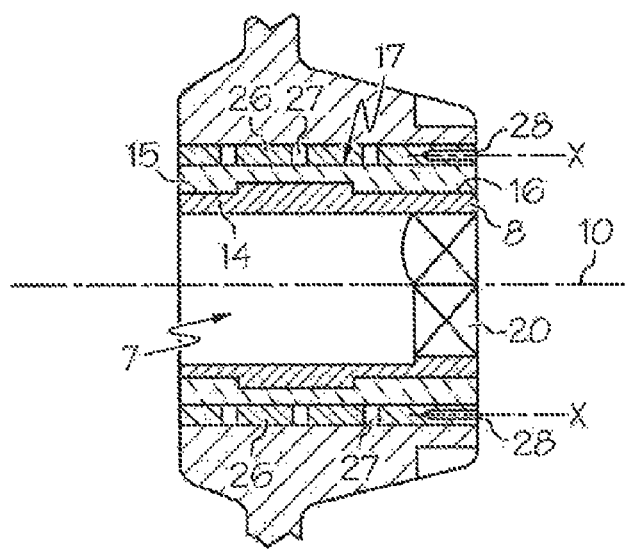
FIG. 2 shows a vertically cut view a hub of the machine element for attachment to a shaft prior to hollowing process.
Figure 4:
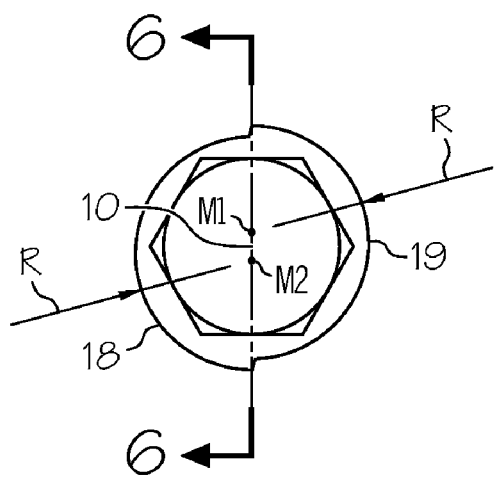
FIG. 4 shows a front view of the clamping element of the hub according to FIG. 3.
Figure 5:
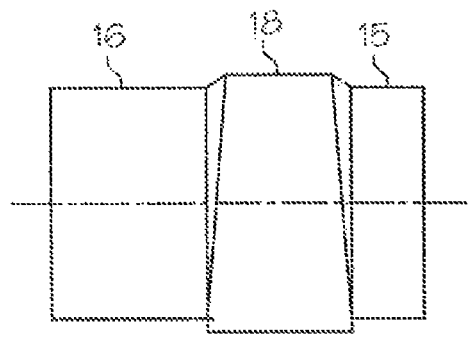
FIG. 5 shows a side view of the clamping element according to FIG. 4.
Figure 6:
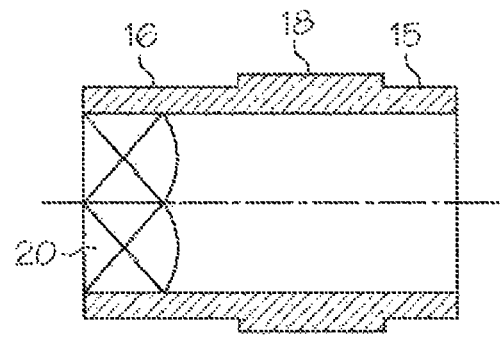
FIG. 6 shows a lengthwise cut view of the clamping element according to FIG. 5 prior to hollowing process.
Figure 8:
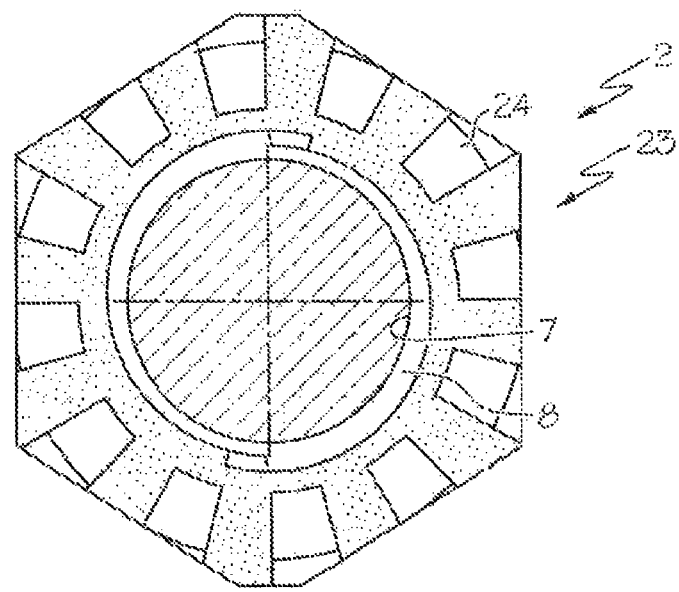
FIG. 8 shows a cut along the VIII-VIII line of the shaft and axial locking ring according to FIG. 7.

As evident from FIG. 2 along with FIG. 4 to 6, the clamping element 8 is essentially sleeve-shaped in design. It has a relatively thin wall 14, which centrally envelops the borehole 7. For example, the wall 14 consists of a metal, such as steel. The clamping element 8 is slightly flexible in the radial direction. In this case, its wall 14 is closed over its entire periphery, i.e., no slits are provided. The elasticity is created by predetermined bending points or breaking points, or by the thinness of the clamping element wall.

The outside of the clamping element 8 has at least one, and preferably two, essentially cylindrical jacket surface sections 15, 16, between which a clamping section 17 is arranged. The clamping section 17 exhibits a profile that is not circular. One such example is illustrated on FIG. 4. In the present case, it consists of two cylindrically bent cam surfaces 18, 19, the radii R of which relate to midpoints M1, M2, which each are spaced apart from the rotational axis 10.

The cylindrical section of the borehole 7 is followed by an Allen wrench segment 20 bordered hexagonally or on multiple surfaces. The mold clamping profile can also be a front claw profile. The latter is used for placing an Allen wrench in order to twist the clamping element 8 against the machine element 2.

Figure 3:
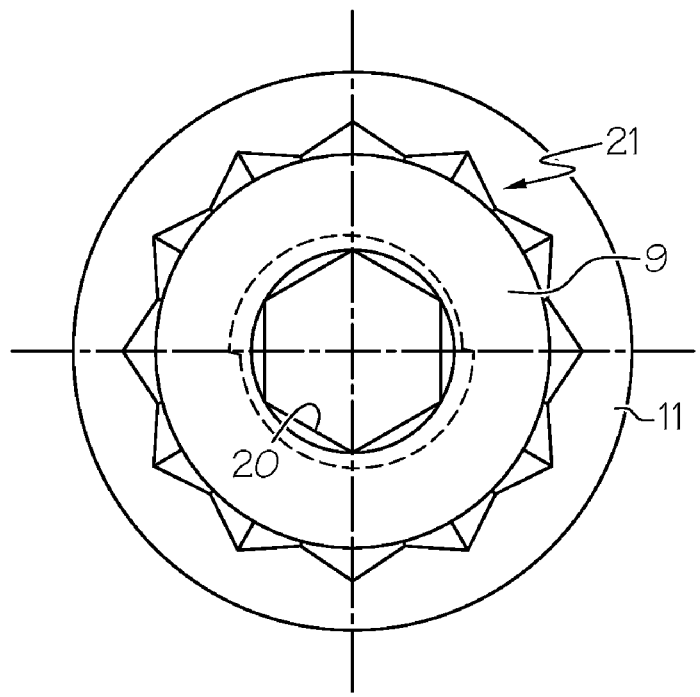
FIG. 3 shows a front view of the hub according to FIG. 2.

The hub 9 is correspondingly provided with a mold clamping profile 21, for example in the form of a toothed profile or notched profile, which is also suitable for the placement of a torque-generating tool, such as a clamping system or the like. The Allen wrench section 20 and mold clamping profile 21 are separately displayed on FIG. 3. This figure illustrates the hub 9 and a portion of the disk-shaped section 11 enveloping it.

Based on the example of the pulley 3, the machine element 2 is manufactured as follows: The pulley 3 is manufactured using an injection molding tool with a central receptacle for the clamping element 8. The latter is already provided with its Allen wrench profile or other profile. It can also exhibit the completely machined borehole 7. However, it most preferably has a greater wall thickness, (i.e., the borehole 7 is undersized). The clamping element 8 is positioned in the injection molding tool in such a way that the outer cylindrical surface sections 15, 16 are arranged largely coaxial to the later desired rotational axis. The precision requirements are here not all that stringent. The hub 9, section 11 and outer part of the pulley 3 are then fabricated in the injection molding process, wherein the here liquid or plastic material envelops the clamping element 8. As a result, in particular the clamping section 17 projecting radially outward over the surface sections 15, 16 are overlapped on both sides by the material of the hub 9. The material of the hub 9 seamlessly abuts the preferably very smooth surface of the clamping element 8. If necessary, a liquid or powder release agent can be applied to prevent too intimate a bond between the material of the hub 9 and the outer surface of the clamping element 8.

After the pulley 3 has been molded, the borehole 7 is formed centrally relative to the rotational axis 10, and the wall thickness of the clamping element 8 is reduced. For example, this can be accomplished by drilling or, as preferred, hollowing out. To this end, the pulley 3 is accommodated by a clamping system on a suitable surface, for example the annular surface 12 or 13, or on its outer edge 22. It is then concentrically turned relative to the rotational axis 10, and the inner surface of the borehole 7 is machined to size with a hollowing tool. This size (i.e., the inner diameter established in this way) is large enough so that the pulley 3 with the borehole 7 can be easily slipped onto the shaft 4 by hand, without generating too great a resistance or too much clearance.

The clamping element 8 is twisted slightly against the hub 9 to manufacture the shaft-hub connection 1. To this end, a clamping system or tool is placed in the Allen wrench section 20, and a corresponding gripper is placed on the clamp molding profile 21. Twisting the clamping element 8 against the hub 9 by several (few) degrees first loosens a potentially adhesive bond between the clamping element 8 and pulley (i.e., the clamping element 8 is broken off). This is followed on FIG. 4 by a clockwise rotation (i.e., in such a way that the cam surfaces of the counter-surfaces 23, 24 formed in the hub 9 during the injection molding process are forced radially inward). As a result, the centering of the sleeve formed by the clamping element 8 is retained owing to the centering of the surface sections 15, 16. The clamping element 8 deforms elastically, wherein the inner wall of the borehole 7 presses rigidly against the shaft 4, in particular in the area of the clamping section 17, creating a torque-proof connection. This yields a precisely true running, easily manufactured shaft-hub connection that can be detached again if needed.

Figure 7:
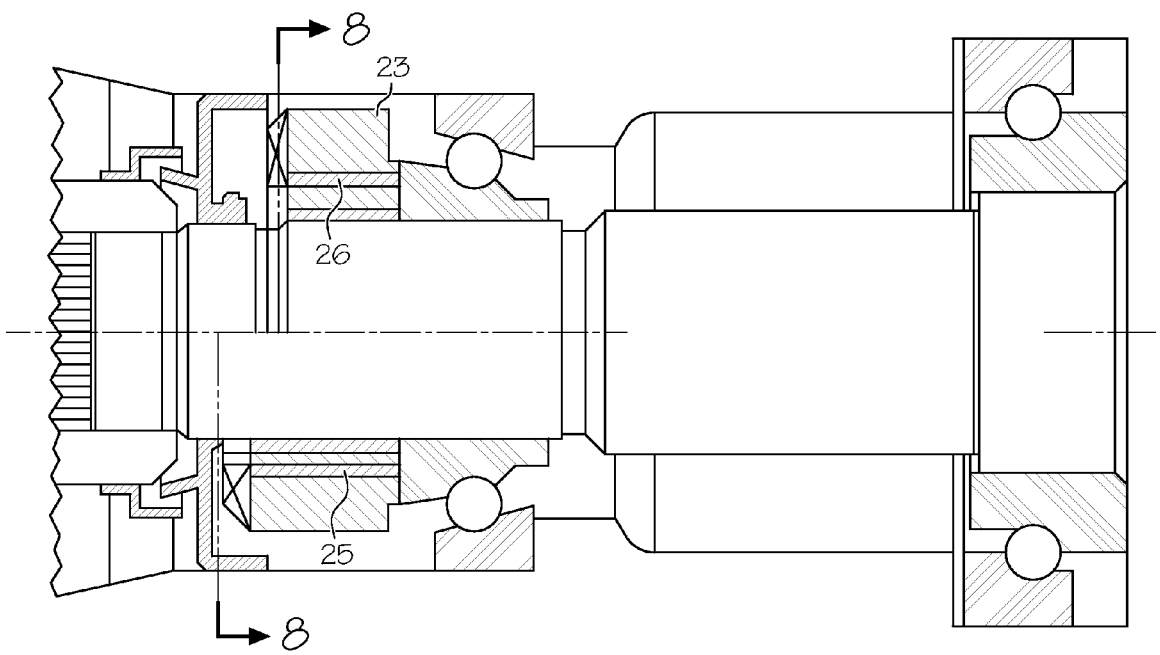
FIG. 7 shows a partial lengthwise cut view of a shaft with an axial locking ring with wedge clamping device according to an embodiment.

FIG. 7 depicts a modified application. The shaft-hub connection serves for axially securing a locking ring 23, illustrated in the top half of FIG. 7 and bottom half of FIG. 7 in different variants. For example, it differs in terms of axial length. The face of the axial locking ring 23 can exhibit teeth 24 used to secure a tool. The locking ring 23 can consist of plastic, steel or another material. The clamping element 8 is once more pressed into a central opening of the machine element 2 here designed as the locking ring 23, and can be rotated against the locking ring 23, so as to elastically deform radially inward in the process. The face of the clamping element 8 can have teeth, so as to be twisted against the locking ring 24.

During manufacture, the clamping element 8 is again pressed into the locking ring 23, after which the central borehole 7 and possibly yet another axial face of the clamping element 8 and/or a face 25 of the locking ring 23 are finish-machined. The subsequent machining of the unit comprised of the machine element 2 and clamping element 8 results in a precise true running and, in the case of the locking ring 23, avoids any wobbling impact of the face 25.

The shaft-hub connection according to the embodiment encompasses a machine element 2 with a clamping element 8, which forms a structural unit with the machine element 2. The clamping element 8 has a central, preferably cylindrical borehole 7 for accommodating a shaft, and is thin-walled enough so that it can be defined radially inward. Its inner cylindrical bearing surface is preferably generated only once a molded blank provided to form the clamping element 8 has been securely placed in the machine element 2. The machine element 2 provided with the clamping element 8 has a high clamping accuracy, and is easy and efficiently to manufacture.

While at least one exemplary embodiment has been presented in the foregoing detailed description, it should be appreciated that a vast number of variations exist. It should also be appreciated that the exemplary embodiment or exemplary embodiments are only examples, and are not intended to limit scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A machine element for a shaft-hub connection, comprising
   an external body portion;
   a hub having an interior surface arranged at a radial distance inside and concentric with the external body portion;
   a support sleeve arranged concentrically within the external body portion and including a feed through opening through which the external body and the hub are integrally bonded through the feed through opening;
   a receiving area formed on the interior surface of the hub;
   a clamping element arranged on the receiving area; and
   an aperture within the clamping element that is configured to permit a shaft to extend there through that when twisted within the clamping element establishes a connection between the shaft and the external body portion, where the support sleeve at least partially absorbs torque exerted by the shaft resulting from the twisting.

2. The machine element according to claim 1, wherein the machine element is formed of injection molding plastic.

3. The machine element according to claim 1, wherein the machine element is at least partially formed of a duromer material.

4. The machine element according to claim 1, wherein the support sleeve comprises at least one threaded borehole running in an axial direction.

5. The machine element according to claim 1, wherein the support sleeve has an average roughness ($R_a$) of about 0.1-50 μm.

6. The machine element according to claim 1, wherein the support sleeve comprises notches fabricated via cold forming.

7. The machine element according to claim 1, wherein the clamping element is configured to elastically compress in a radial direction.

8. The machine element according to claim 1, wherein an outside of the clamping element has a wedge profile.

9. The machine element according to claim 1, further comprising a mold clamping profile.

10. A shaft-hub connection for a torque-proof coupling of rotating machine elements with shafts, comprising:
    a shaft having a bearing surface; and
    a machine element, the machine element comprising:
       an external body portion;
       a hub having an interior surface arranged at a radial distance inside and concentric with the external body portion;
       a support sleeve arranged concentrically within the external body portion and including a feed through opening through which the external body and the hub are integrally bonded through the feed through opening;
       a receiving area formed on the interior surface of the hub;
       a clamping element arranged on the receiving area; and
       an aperture within the clamping element that is configured to permit a shaft to extend there through that when twisted within the clamping element establishes a connection between the shaft and the external body portion, where the support sleeve at least partially absorbs torque exerted by the shaft resulting from the twisting.

11. A method for manufacturing a shaft-hub connection, comprising the steps of:
preparing a machine element comprising:
an external body portion;
a hub having an interior surface arranged at a radial distance inside and concentric with the external body portion;
a support sleeve arranged concentrically within the external body portion and including a feed through opening through which the external body and the hub are integrally bonded through the feed through opening;
a receiving area formed on the interior surface of the hub;
a clamping element arranged on the receiving area, and
an aperture within the clamping element configured to permit a shaft extending there through to be twisted against the machine element;
arranging the support sleeve at a radial distance outside and concentrically with the interior surface of the hub;
machining the clamping element to create an aperture within the clamping element, the aperture configured to permit a shaft extending there through to be twisted against the machine element;
inserting the shaft into the aperture; and
twisting the shaft relative to the machine element to establish a torque-proof connection between the shaft and the external body portion, where the support sleeve at least partially absorbs torque exerted by the shaft resulting from the twisting.

* * * * *